United States Patent [19]

Casanova et al.

[11] Patent Number: 4,856,572

[45] Date of Patent: Aug. 15, 1989

[54] TIRE WITH RADIAL CARCASS REINFORCEMENT PROVIDED WITH A PROTECTIVE RIB ON AT LEAST ONE SIDE WALL

[75] Inventors: Philippe Casanova, Clermont-Ferrand; Jean-Louis Lateulere, Chamalieres, both of France

[73] Assignee: Compagnie Generale des Etablissements Michelin-Michelin et Cie, Clermont-Ferrand Cedex, France

[21] Appl. No.: 96,608

[22] Filed: Sep. 11, 1987

[30] Foreign Application Priority Data

Sep. 30, 1986 [FR] France ................. 86 13723

[51] Int. Cl.$^4$ ........................... B60C 13/00
[52] U.S. Cl. ..................... 152/454; 152/523
[58] Field of Search ............ 152/523, 454, 209 B, 152/524, DIG. 12; 156/116

[56] References Cited

U.S. PATENT DOCUMENTS

| | | | |
|---|---|---|---|
| 2,199,466 | 5/1940 | McRaven | 152/523 |
| 2,340,258 | 1/1944 | Brunner | 152/523 |
| 2,572,259 | 10/1951 | Gottschall | 152/523 |
| 2,600,231 | 6/1952 | Ewart | 152/454 X |
| 3,516,467 | 6/1970 | Sims | 152/523 X |
| 3,811,488 | 4/1974 | Duncan . | |
| 3,825,052 | 7/1974 | Matsuyama et al. . | |
| 4,120,337 | 10/1978 | Soma et al. . | |
| 4,405,007 | 9/1983 | Welter | 152/523 X |
| 4,664,167 | 5/1987 | Kawakami et al. | 152/209 B |

FOREIGN PATENT DOCUMENTS

| | | | |
|---|---|---|---|
| 2131874 | 11/1972 | France . | |
| 0016113 | 1/1986 | Japan | 152/523 |
| 2003805 | 3/1979 | United Kingdom . | |

Primary Examiner—Michael W. Ball
Assistant Examiner—Geoffery L. Knable
Attorney, Agent, or Firm—Brumbaugh, Graves, Donohue & Raymond

[57] ABSTRACT

A radial off-road tire has a sidewall provided with a protective rib which is located substantially at or outwardly of the level of the maximum axial width of the carcass reinforcement. The geometrical characteristics of length, thickness and location of the protective rib to the rest of the wall, combined with the characteristics of meridian radius of curvature of the tread and the angle which the upper face of the sidewall makes with the direction parallel to the axis of rotation of the tire makes it possible to increase the life of the tire and minimize the rate of propagation of scratches initiated by cutting objects.

4 Claims, 1 Drawing Sheet

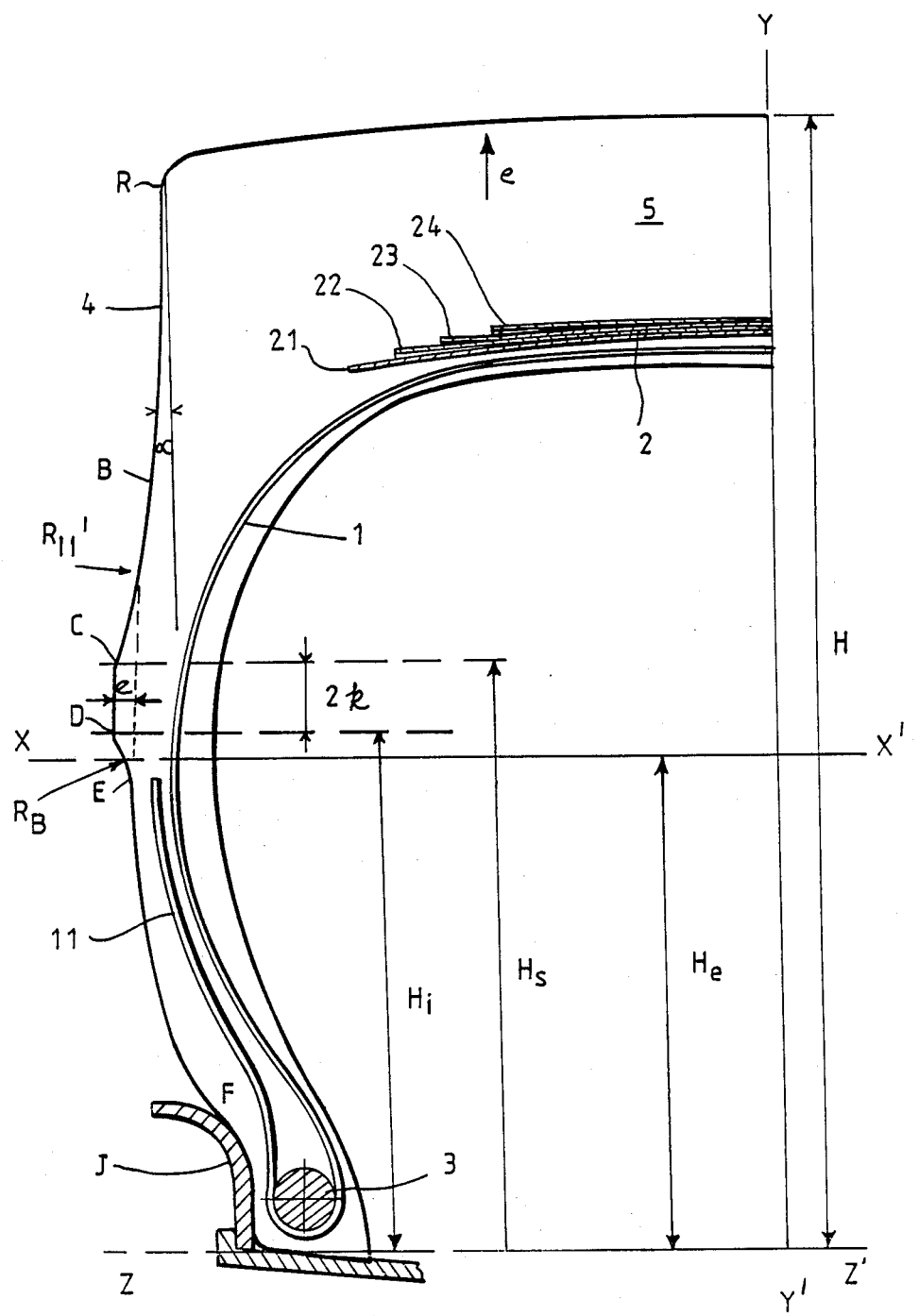

TIRE WITH RADIAL CARCASS REINFORCEMENT PROVIDED WITH A PROTECTIVE RIB ON AT LEAST ONE SIDE WALL

BACKGROUND OF THE INVENTION

The present invention relates to tires intended for off-road use on loading, earth-moving and transportation equipment, for example, equipment used in quarries or underground mines. Such tires have a radial carcass reinforcement and a crown reinforcement formed of at least two superimposed plies of cables forming an acute angle with the circumferential direction.

Tires of this type operate under severe conditions of load, and they travel on ground strewn with cutting objects (blocks of stone having sharp edges, metal objects, etc.) and often in mud and water. These cutting objects initiate numerous cuts of scratches on the tread and sidewalls of the tire. The cuts and scratches are propagated more or less rapidly in length and depth under the effect of the repeated flexures of the tire. The cuts and scratches increase in length and depth as a function of their number, their initial depth and length, their direction and the distance between them, and ultimately they may reach the radial carcass reinforcement and cause relatively rapid destruction of the reinforcement or result in loss of rubber and rapid degradation of the sidewalls.

In order to reduce the risk of damage to the side-walls of a tire, it has heretofore been proposed in French Pat. No. 1,452,787 that the region of the sidewall close to the thread, that is, the shoulder region, be provided with a protuberance which protrudes with respect to all portions of the sidewall under severe conditions of load. The radially outer face of said protuberance forms an angle of $70 \pm 10$ degrees with the transverse direction, and the maximum axial width of the tire is then located at a distance h, measured from the crown of the tire, equal to about ¼ of the total height H of the tire.

Such protuberances are particularly effective against the propagation of cuts caused by protruding rocks on the surface of the ground or the side surfaces or walls of the underground galleries. However, as the cuts are concentrated on these protuberances, the protuberances rapidly become ineffective due to their rapid destruction by degradation, such as wear and tearing. As the distance d, the difference between the maximum axial width and the nominal axial width of the tire under load, becomes negative, the sidewall of the tire loses its protection at the level of the nominal axial width.

It is also well known that the sidewalls of tires, particularly tires of vehicles which make frequent stops along the curb of sidewalks, can be protected by circumferential bands or protective ribs, for example, as disclosed in French Pat. No. 2,131,874. These bands or ribs are located substantially at the mid-height of the sidewall of the tire and withstand wear by rubbing or scraping. On the other hand, when they come into contact with cutting objects, these bands or ribs, due to their location, are subject to numerous and severe cuts which extend and enlarge rapidly and so are unsuitable for tires of the type with which the present invention is concerned.

SUMMARY OF THE INVENTION

The object of the present invention is to remedy the above-mentioned disadvantages and to impart to the sidewall of the tire of the type described above an outer profile which minimizes not only the initiation of cuts and scratches in the tire, but in addition, the rate of extension and enlargement of scratches which have been initiated by contact of the tire with cutting objects.

The tire, in accordance with the invention, has a radial carcass reinforcement which is anchored to at least one bead wire in each bead and a crown reinforcement formed of at least two superimposed plies of cables, parallel to each other in each ply and crossed from one ply to the next forming acute angles with the circumferential direction. The tire has two sidewalls connected by an outer tread, and at least one of the sidewalls has a circumferential protective rib, located radially substantially at the level of the largest axial width of the carcass reinforcement. With the tire, seen in radial section, mounted on its operating rim and inflated to its service pressure without load, the protective rib has a linear outer face which forms an angle equal to $0° \pm 5°$ with a vertical plane perpendicular to the axis of the tire and is delimited radially by upper and lower ends having heights $H_s$ and $H_i$, respectively, such that $$0.05H < H_s - H_i = 2k < 0.07H$$

with $H_i$ being between $H_e - 0.5k$ and $H_e + 0.5k$, H being the total height of the tire $H_e$ being the height corresponding to the largest axial width of the carcass reinforcement and 2k being the length of the linear outer face. The heights H, $H_e$, $H_i$ and $H_s$ are measured from the bead seat of the rim as shown in the accompanying drawing. The protective rib has thickness e of between 0.5k and k.

The linear face of the rib is connected to the upper end of the sidewall by concave portion of radius $R_H$ of between 10e and 45e extended tangentially by a linear upwardly extended portion forming an angle between $0°$ and $5°$ with a central vertical plane of the tire. The linear face of the rib is also connected to the convex surface of the lower part of the sidewall by a concave portion of radius $R_B$ of between e and 4e, the tread of the tire having a meridian or transverse radius of curvature at least equal to 1.5 times its circumferential radius of curvature.

The height $H_i$ of the radially lower end of the linear surface of the protective rib is preferably at least equal to the height $H_e$, corresponding to the height of the largest axial width of the carcass reinforcement, so that the rib is located above, i.e., outwardly of, the axis of largest axial width.

The tread of such a tire may or may not be provided with grooves, more specifically, transverse and oblique grooves which open on the side faces of the tire in the region of the shoulders. Preferably the tread is without grooves because it is possible to achieve in such a tire a substantial improvement in the resistance to degradation of the sidewalls by the tearing out of pieces of rubber, particularly when the tire is subjected to use under severe conditions. If the presence of grooves is desirable, the depth of these grooves, measured at the level of the side face, should preferably not be greater than the radial height of the linear surface of the upper side face, designated AB in the drawing, in order to avoid a concentration of stresses at the bottom of the grooves, which concentration might then give rise to ruptures of the rubber by fatigue.

On a tire sidewall, a scratch or cut, initiated by a cutting object generally is propagated in an oblique direction. If the direction of initiation of the scratch is close to said direction of propagation, then the rate of propagation of the scratch in length and depth is high. On the other hand, if the direction of initiation is substantially meridian or circumferential then the rate of propagation is much less. In the most disadvantageous case, it has been found that the rates of propagation were a function of the cycle followed by the sum of the principal stresses (maximum stress and minimum stress) at the ends of the scratches during the path followed by these ends from entrance into the contact of the tire with the ground until the emergence from said surface. If one considers the meridian and circumferential deformations at a given point on the outer face of the sidewall, then the rate of propagation is substantially proportional to the sum of these deformations, integrated along the angle formed by the vertical plane extending from the axis of rotation to the ground and by the meridian plane containing the point in question, the limits of integration being the two angle values corresponding to the entrance and emergence of the point in question into and from the area of contact between the tire and the ground. To reduce or even eliminate the rates of propagation requires minimizing the above integral, and such a reduction can be obtained by doing away with the meridian deformation or, even better, by making said meridian deformation negative for loads applied to the tire at between the service load and 1.5 times the service load.

The configuration of the outer face of the sidewall of the tire, as herein described, makes it possible to obtain at any point of said face, contained between the end of the tread and the lower end of the vertical face of the rib, a zero or negative meridian deformation during the path of the point corresponding to the passage in the contact area, the reference zero deformation being taken on the tire inflated and not under load.

THE DRAWING

The accompanying drawing, shows by way of illustration and not of limitation, one embodiment of the invention which is described in detail below.

The drawing shows half of the cross section of a 26.5.25 X tire according to the invention, the other half being symmetrical with respect to the center vertical plane YY'.

DESCRIPTION OF THE PREFERRED EMBODIMENT

The tire, mounted on its operating rim J and inflated to its service pressure and not placed under load, has a width of 558.8 mm and a nominal radius of 317.5 mm (axis ZZ' of the bead seat). The radial carcass reinforcement 1 is formed of a single ply of metal cables anchored to a bead wire 3 by means of the upturned portion 11. This carcass reinforcement 1 has its maximum axial width at the height $H_e$ measured from the axis ZZ' of the bead seat, the height $H_e$ defining the axis XX' of largest axial width.

The crown reinforcement 2 is formed of two plies 21, 22 of metal cables of little extensibility and of two plies 23, 24 of elastic cables, the cables of these plies 21, 22, 23, 24 forming with the circumferential direction angles which are identical or different within the range between 5° and 65°.

The outer face of the sidewall 4 of the tire has a profile which, starting from the end A of the tread 5, includes five radial components:

(a) a linear component AB forming an angle α between 0° and 5° with a central vertical plane of the tire;

(b) a concave component BC tangent at B to the component AB and of radius $R_h$ equal to 470 mm;

(c) a component CD parallel to the vertical plane YY' and a length 2k equals 35 mm, that is, 0.06 times the height H of the tire on the rim, the height H being 585 mm and the height $H_i$ of the lower end D measured from the rim being equal to $H_e + 7.5$ mm;

(d) a concave component DE of radius $R_b$ equal to 43 mm; and (e) a convex component EF which extends to the point of tangency F of the profile with the flange of the rim J.

The component CD provides a protective rib of substantially trapezoidal shape BCDE, BE representing the contour of the sidewall in the absence of the protective rib, and the thickness e, measured on the axis of symmetry of the component CD between the faces CD and BE is equal to 0.6k, namely, 11 mm.

The meridian or transverse radius of curvature ρ of the surface of the tread 5 is equal to 2400 mm, that is to say, a radius very much greater than the circumferential radius of curvature of 896 mm.

A tire as described herein, applied to off-road loading, earth-moving and transportation vehicles, has an improved life and increased resistance to the initiation of scratches and cuts on the sidewall and to fatigue of the sidewalls after travel under heavy load (1.5 times the rated load, equal to 17,000 daN for a service pressure of 5.5 bars). Moreover, the rates of propagation of the scratches by extension and enlargement, particularly those which are the most dangerous in view of their initial orientation, are considerably reduced, increasing the life of the tire and improving the appearance of the sidewalls of the tire.

We claim:

1. A tire for off-road use on loading, earth-moving and transportation vehicles comprising a radial carcass reinforcement anchored to at least one bead wire in each bead, a crown reinforcement formed of at least two superimposed plies of cables parallel to each other in each ply and crossed from one ply to the next forming acute angles with the circumferential direction, two sidewalls, at least one of which is provided with a circumferential protective rib located radially substantially at the level of the largest axial width of the carcass reinforcement, and a tread connecting said sidewalls, characterized by the fact that, with the tire viewed in cross section and mounted on its service rim and inflated to its service pressure without load, the protective rib has a linear outer face CD forming an angle equal to 0°±5° with a vertical plane perpendicular to the axis of the tire and delimited radially by an upper end C and a lower end D having heights $H_s$ and $H_i$, respectively, such that $$0.05H < H_s - H_i = 2k < 0.07H$$

with $H_i$ between $H_e - 0.5k$ and $H_e + 0.5k$, H being the height of the tire, $H_e$ being the height corresponding to the largest axial width of the carcass reinforcement and 2k being the length of the linear outer face CD, and has a thickness e of between 0.5k and k;

the linear outer face CD of the rib being extended, on the one hand, radially outwards by a concave portion CB having a curvature radius $R_H$ of between 10e and 45e and a curvature center located axially outside the tire, the concave portion CB being extended radially outwards by a linear portion BA forming an angle between 0° and 5° with a central vertical plane of the tire, A being a point on the sidewall surface adjacent the surface of the tread, the tread surface having a transverse radius of curvature $\rho$ at least equal to 1.5 times its circumferential radius of curvature, and, on the other hand, radially inwards by a concave portion DE having a curvature radius $R_B$ of between e and 4e and a curvature center located axially outside the tire, the concave portion DE being extended radially inwards by a convex portion EF having a curvature center located axially inside the tire, F being the tangency point of the sidewall surface with a flange of the service rim;

said heights H, $H_e$, $H_i$ and $H_s$ being measured from the bead seat of the rim;

said thickness e being measured on the axis of symmetry of the linear outer face CD and being the distance between the linear outer face CD and an imaginary linear face BE representing the sidewall contour in the absence of the protective rib.

2. A tire according to claim 1, characterized by the fact that the height $H_i$ of the lower end D is at least equal to the height $H_e$ corresponding to the largest axial width of the carcass reinforcement.

3. A tire according to claim 2, characterized by the fact that the tread is without transverse or oblique grooves which open on the linear portion BA of the sidewalls.

4. A tire according to claim 2, characterized by the fact that the tread has transverse or oblique grooves which open on the linear portion BA of the sidewalls and the depth of the grooves is at most equal to a radial distance of the linear portion BA.

* * * * *